No. 765,283. Patented July 19, 1904.

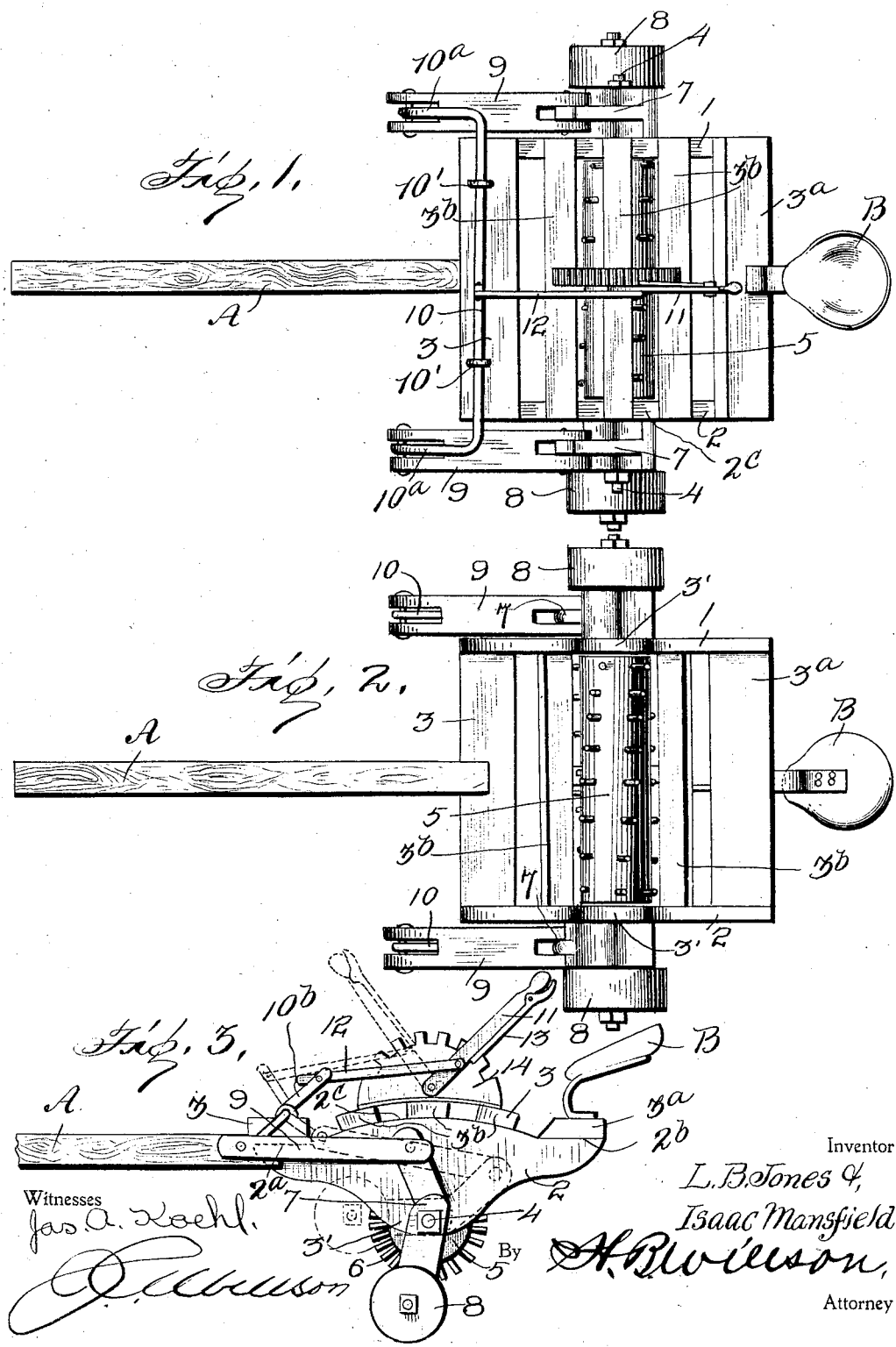

UNITED STATES PATENT OFFICE.

LEONIDAS B. JONES AND ISAAC MANSFIELD, OF CHATTANOOGA, TENNESSEE.

HARROW.

SPECIFICATION forming part of Letters Patent No. 765,283, dated July 19, 1904.

Application filed October 8, 1903. Serial No. 176,275. (No model.)

*To all whom it may concern:*

Be it known that we, LEONIDAS B. JONES and ISAAC MANSFIELD, citizens of the United States, residing at Chattanooga, in the county of Hamilton and State of Tennessee, have invented certain new and useful Improvements in Harrows; and we do declare the following to be a full, clear, and exact description of the invention, such as will enable others skilled in the art to which it appertains to make and use the same.

This invention relates to harrows.

The object of the invention is to provide a harrow which is simple of construction and efficient in use and in which provision is made for elevating the harrow-teeth above the ground-surface and enabling the device to be conveniently transported from place to place.

With these and other objects in view the invention consists of certain novel features of construction, combination, and arrangement of parts, as will be hereinafter more fully described, and particularly pointed out in the appended claim, reference being had to the accompanying drawings, in which—

Figure 1 is a top plan view of a harrow, constructed in accordance with our invention. Fig. 2 is a bottom plan view of the same, and Fig. 3 is a side view showing the two positions of the supporting wheels or rollers and adjusting mechanism therefor in full and broken lines.

In carrying our invention into practice we provide a frame preferably consisting of the side or end pieces 1 and 2, connected by upper transverse bars 3 and $3^a$ and slats $3^b$, the latter forming a deck or platform. Each side piece is provided with a bearing 3', depending from the center of the lower surface thereof, and the upper edge or side piece has its end portions $2^a$ and $2^b$ depressed in the same plane and parallel to the horizontal plane of the bearing 3' and with an intermediate curved portion $2^c$, which is curved on an arc concentric with said bearing. The bars 3 and $3^a$, which are respectively arranged at the front and rear of the frame, rest upon the portions $2^a$ and $2^b$ of the side pieces, while the slats $3^b$ rest upon the curved portions $2^c$ thereof and form a curved deck or platform which extends transversely of the frame and terminates above said bearings. Connected to the bar 3, preferably at the center thereof, is a tongue or draft device A, and connected to the bar $3^a$ in line with said tongue is a seat B. This seat is so arranged relatively to the platform $3^b$ that the latter forms a support for the feet of the rider, as well as a guard or housing above the harrowing-wheel, as hereinafter described. In the bearing 3' a shaft 4 is journaled, and this shaft carries a roller 5, provided with projecting harrow-teeth 6, adapted to break up clods and lumps of earth upon the movement of the device over the surface of the ground. This roller is arranged between the side pieces and below the platform $3^b$, whereby contact with the roller from above is avoided. The roller and harrow-teeth may be of any preferred construction and by their revolving action effect the quick breaking up of the clods.

The ends of the shaft 4 are extended beyond the side pieces 1 and 2, and to the extended ends are connected bell-crank levers 7, one arm of each of which is provided with a ground wheel or roller 8, while the opposite arm is connected to a link 9, the two links being connected to the angularly-projecting ends of a crank-shaft 10, by means of which they may be operated. A pivoted hand-lever 11 is connected to this shaft 10 by means of a link 12. By reference to Fig. 3 it will be seen that when the hand-lever 11 is moved back the bell-crank levers will be adjusted to a vertical position, with the rollers 8 projected below the harrow-teeth, so as to run upon the surface of the ground and raise the frame to elevate the toothed roller above the ground, thereby enabling the machine to be transported without the roller offering any resistance to its movement and without liability of the teeth coming in contact with obstacles and becoming bent, broken, or otherwise injured. When, however, the lever is thrown forward, the bell-crank levers are brought to a substantially horizontal position and the wheels or rollers 8 are elevated above the plane of the teeth upon the lower periphery of the roller 5 to lower the frame and toothed roller, so that said toothed roller may be used for harrowing purposes. In this adjustment the lower surfaces of the rollers 8 lie in the plane of the lower surface of the roller 5, so that they supplement the supporting action of the roller 5, while avoiding interference with the action of the teeth 6. By this means the entire weight of the harrow instead of being sustained by the toothed roller is partially transferred to the ground-wheels, thus preventing undue strain upon the teeth 6 when hard obstacles are encountered.

The lever 11 carries a pawl 13 to engage a rack 14 to lock the bell-crank levers at any desired position of adjustment.

It will be observed that the shaft 10 is journaled in bearings 10' upon the front cross-bar 3 and has its ends extended beyond the same to form the cranks 10$^a$, which are connected by the links 9 with the upper arms of the bell-crank lever 7, the said links being arranged exteriorly of and alongside the side pieces 1 and 2, and, further, that the link 12 is connected to the shaft 10 through the medium of a crank-arm 10$^b$, extending from the center of said shaft, and that the lever 11 is pivoted upon one side of the rack 14, which is secured to the platform 3$^b$, substantially in line with the draft device and seat, so that said lever may be operated by the driver from his position on said seat and the pull or push upon the crank-shaft 10 will be substantially in the line of the draft and will not cause the harrow to turn or slew.

From the foregoing description, taken in connection with the accompanying drawings, the construction, operation, and advantages of this invention will be readily understood without requiring a more extended explanation.

Various changes in the form, proportion, and the minor details of construction may be resorted to without departing from the principle or sacrificing any of the advantages of this invention.

Having thus described our invention, what we claim, and desire to secure by Letters Patent, is—

A harrow comprising a frame provided with a platform having a seat at the rear thereof, and provided also with two sets of bearings, one below the center of the platform and the other upon the upper front portion thereof, a transverse shaft journaled in said center bearings and having extended ends, a toothed harrowing-roller mounted upon said shaft below said platform, an actuating-shaft journaled in said front bearings and having extended ends formed into cranks, bell-cranks upon the extended ends of the roller-shaft, a ground-wheel upon one arm of each bell-crank, links extending alongside the platform and connecting the other arms of the bell-cranks to the cranked ends of the actuating-shaft, a rack upon the platform, an operating-lever pivotally mounted alongside the rack in position to be operated from the seat, and provided with a pawl to engage said rack, and a link connecting said lever with the intermediate crank of the actuating-shaft, substantially as described.

In testimony whereof we have hereunto set our hands in presence of two subscribing witnesses.

LEONIDAS B. JONES.
ISAAC MANSFIELD.

Witnesses:
   E. H. MATTHEWS,
   F. A. CRITCHFIELD.